Sept. 4, 1923.
W. MATHESIUS
GAS WASHER TOWER
Filed July 15, 1920
1,467,184
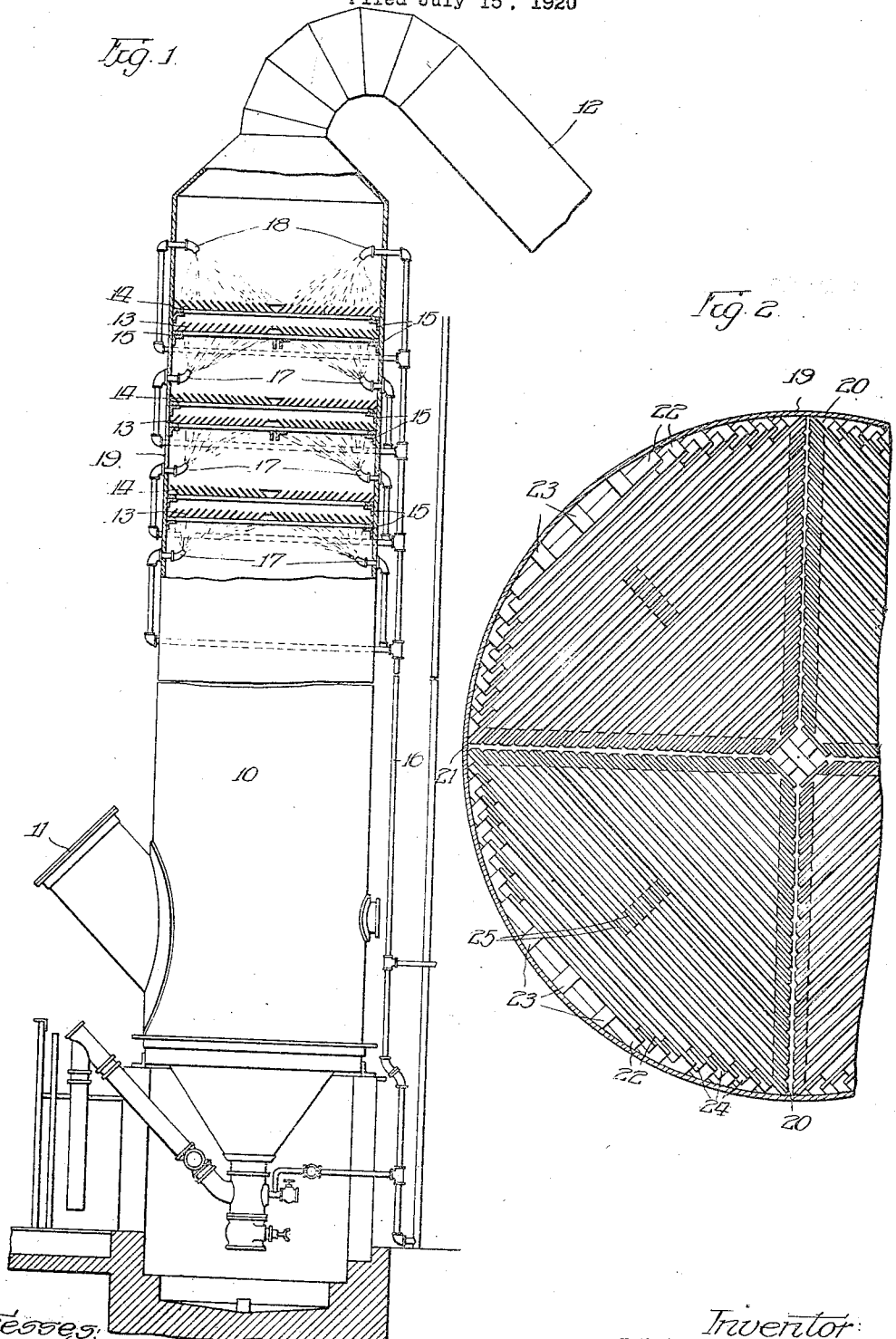
Witnesses:
R. Burkhardt
Milton J. Miller
Inventor:
Walther Mathesius
By R. Anthony Nunn
atty.

Patented Sept. 4, 1923.

1,467,184

UNITED STATES PATENT OFFICE.

WALTHER MATHESIUS, OF CHICAGO, ILLINOIS.

GAS-WASHER TOWER.

Application filed July 15, 1920. Serial No. 396,550.

*To all whom it may concern:*

Be it known that I, WALTHER MATHESIUS, a citizen of the United States, residing at Chicago, in the county of Cook and State of Illinois, have invented certain new and useful Improvements in Gas-Washer Towers, of which the following is a specification.

My invention relates to baffles for use in a gas washer tower, particularly the upper portion thereof, and has for its particular object the removal of the finer particles of dust and dirt from the gas as it passes through the gas washer tower by varying the flow of the gas therethrough and changing the direction of the current of the gas. It will be understood that in building gas washers it is the practice to provide spaced hurdles in the lower portion of the gas washer tower through which the gas passes and where it is brought into contact with streams of water passing downward over the hurdles, which removes the coarser particles of dust and dirt from the gas. After the gas has passed through the hurdles it passes upward through the gas washer tower and through sets of baffles arranged in the upper portion thereof, which are adapted to catch the smaller particles of dust and dirt which were not removed at the time the gas passed through the hurdles.

It is the practice to insert these baffles in sets composed of one pair of frames, each of said frames heretofore being made up of baffle plates disposed at an angle with respect to the vertical plane of the washer tower, all of the plates of each frame being turned in the same direction and extending entirely across the washer tower. The baffle plates of one of the frames making up each set is turned at right angles to the baffles of the other frame making up the set, the baffles of both of the frames extending transversely across the washer tower in the same direction. The gas passing upward through the arrangement of baffles in this form is turned first toward one side of the washer tower and thence to the other side of the tower as it passes through each set of plates.

I have found in practice that a considerable improvement is attained over the results heretofore accomplished by arranging the baffle plates of each frame in sections, such sections constituting sectors of a circle in their horizontal planes, the baffle plates of each section being disposed at an angle with respect to the vertical plane of the gas washing tower. The other frame making up the pair has its plates also made up in sections, the baffle plates of each section being disposed at right angles to the section of the other frame adjacent thereto with respect to the section immediately above or below it. By arranging the plates in this manner, the flow of gas is diverted from its vertical direction of travel alternately toward the axis of the tower and then outwardly towards the shell of the washing tower. Also the one sided working or the channeling of the gas to one side of the tower is overcome and a uniform distribution of the gas over the entire baffle area is secured. Furthermore, I am able to place the spray nozzles in such position that intimate contact between the water and the gas is secured and the spray thrown in a direction either the same as the travel of the gas, or in a direction exactly opposite to the travel of the gas, and thus secure a uniform distribution of the water over the baffle plates. I also provide a spray nozzle to direct a spray of water against each sector of the frame, thus providing for a more even distribution of the water used in the washing operation. This even distribution of the water causes the washing down and removal of the finer particles of dust and dirt with much more thoroughness than has been possible to secure heretofore.

Another and further object of my invention is the provision of baffle plates in such manner that the gas passing through the said tower is uniformly distributed as it passes through the baffle plates and thereby a more intimate contact can be made between the water and the gas as it passes through the baffles, thus resulting in more efficient washing.

These and other objects of my invention will be apparent to those skilled in the art by reference to the accompanying drawings, in which:

Figure 1 is a view of a gas washer tower partially in section through the baffle plates and partially in elevation; and Figure 2 is a plan view of one of the frames showing the arrangement of the baffle plates.

Referring now specifically to the drawings, 10 is a gas washer tower having a gas inlet pipe 11 and a gas outlet pipe 12. In the upper portion of the gas washer tower I provide three sets of baffles. each set being made up of a lower frame 13, and an upper frame 14, respectively, the said frames being held in position by means of angles 15, which are secured to the wall of the gas washer tower in any approved manner. A water supply pipe 16 is provided having suitable connections leading to spray nozzles 17, 17, which are adapted to direct a spray of water upward against the lower frame 13 of each set of baffle plates. Spray nozzles 18, 18 are also provided having suitable connections leading to the water supply pipe 16 which direct a spray of water downward against the upper frame of the top set of baffles in a direction opposite to the direction of travel of the gas.

It will be further understood that the nozzles 17 may be turned downward so that a spray of water is directed against the upper frame 14 of each set of baffles in the same manner as the nozzles 18, although I have found in practice that the arrangement shown is preferable.

Referring specifically to Figure 2, wherein is shown one of the frames 13, a circular frame member 19 is provided having a pair of frame members 20, 21 secured thereto at each of their ends, the said frame members extending across the circular frame 19 and crossing each other at right angles at the center of the frame 19 and thereby dividing the frame 19 into four equal sectors. Secured to the frame 19 and to the cross members 20 and 21 is a plurality of baffle members 22, the said baffle members being disposed at an angle with respect to the vertical axis of the gas washer tower. Filler blocks 23 are provided between the frame member 19 and the outer one of the baffle plates 22. Spacers 24 are also provided at the outer ends of the baffle plates 23 and if necessary, in order to secure proper spacing, spacers 25 may be positioned intermediate the ends of the baffle members 22, although in practice I find that the spacers are only necessary between the longest of the baffle plates 22.

It will thus be understood that the gas in passing upward through the gas washer tower comes in contact with the lower set of baffles 13 and the flow of gas is directed inward after passing through the said set of baffles 13, and is directed upward by means of the baffles 14 towards the gas washer tower wall. This poration is repeated with the passing of the gas through each set of inclined baffles and the dirt and dust is lodged against the baffles by being impinged against the said baffle plates. The spray nozzles direct a flow of water in a direct line with the baffles and passes upward between the baffle plates of each of the lower sections so that they are kept constantly washed clean and the nozzles 18 direct a spray of water downward into the topmost section of the upper row of baffles and in a direction exactly opposite to that in which the gas is passing after it leaves this baffle section. It will be thus understood that an even flow of gas is maintained throughout the upper section of the gas washer tower and that the gas is evenly distributed throughout said section so as to insure a more thorough cleansing and washing of the gas than has been the practice heretofore.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my claims.

I claim:

1. In combination with a gas washer tower of a series of baffles in said tower, each series comprising a pair of frames divided into sectors, baffle plates parallel with each other in each of said sectors and disposed at an angle to the baffle of adjacent sectors and also with respect to the vertical plane of the washer tower, the baffle plates of one frame being disposed at right angles with respect to the baffle plates of the adjacent frame.

2. A gas washer comprising a tower having a gas inlet and a gas outlet, a horizontal baffle within the tower and located between the gas inlet and the gas outlet and divided into sectors, each sector including a set of spaced and parallel baffle bars disposed parallel with the chord of the arc of the sector and transversely inclined to the vertical.

3. A gas washer comprising a tower having a gas inlet and a gas outlet, and a pair of horizontal baffles superposed within the tower and located between the gas inlet and the gas outlet, each baffle being a circular grating divided into sectors, each sector including a set of spaced and parallel baffle bars disposed parallel with the chord of the arc of the sector and transversely inclined to the vertical, the baffle bars of one baffle being transversely inclined towards the longitudinal axis of the gas washer, and the baffle bars of the other baffle being inclined away from the longitudinal axis of the gas washer.

4. A baffle for gas washers comprising a circular grating divided into sectors, each sector including a set of spaced and parallel baffle bars parallel with the chord of the arc of the sector and transversely inclined to the vertical.

Signed at Chicago, Illinois, this 9th day of July, 1920.

WALTHER MATHESIUS.